United States Patent [19]
Press

[11] 3,733,046
[45] May 15, 1973

[54] CONSTRICTABLE TUBE VALVE

[75] Inventor: Irving D. Press, West Orange, N.J.

[73] Assignee: Resistoflex Corporation, Roseland, N.Y.

[22] Filed: Mar. 22, 1971

[21] Appl. No.: 126,436

[52] U.S. Cl.............................................251/8, 251/4
[51] Int. Cl................................................F16k 7/06
[58] Field of Search...............................251/4–10

[56] References Cited

UNITED STATES PATENTS

| 3,624,800 | 11/1971 | Swick | 251/4 |
| 3,610,566 | 10/1971 | Rychlik | 251/9 |
| 143,907 | 10/1873 | Hyde | 251/7 |
| 2,467,150 | 4/1949 | Nordell | 251/5 X |

FOREIGN PATENTS OR APPLICATIONS

| 1,040,349 | 8/1966 | Great Britain | 251/5 |
| 504,449 | 8/1930 | Germany | 251/8 |
| 693,028 | 6/1953 | Great Britain | 251/8 |

Primary Examiner—Martin P. Schwadron
Assistant Examiner—Richard Gerard
Attorney—Robert M. Freeman

[57] ABSTRACT

Clamps disposed at opposite sides of a tube of PTFE resin or other crack sensitive material maintain regions at each side of the tube in constantly constricted fluid sealing condition free from crack inducing flexure secured in sealing embrace about a smoothly curving filler piece. In combination with a pair of compressor members there is thus provided a constrictable tube valve having a tube of crack sensitive material which wild not crack upon valve manipulation.

17 Claims, 8 Drawing Figures

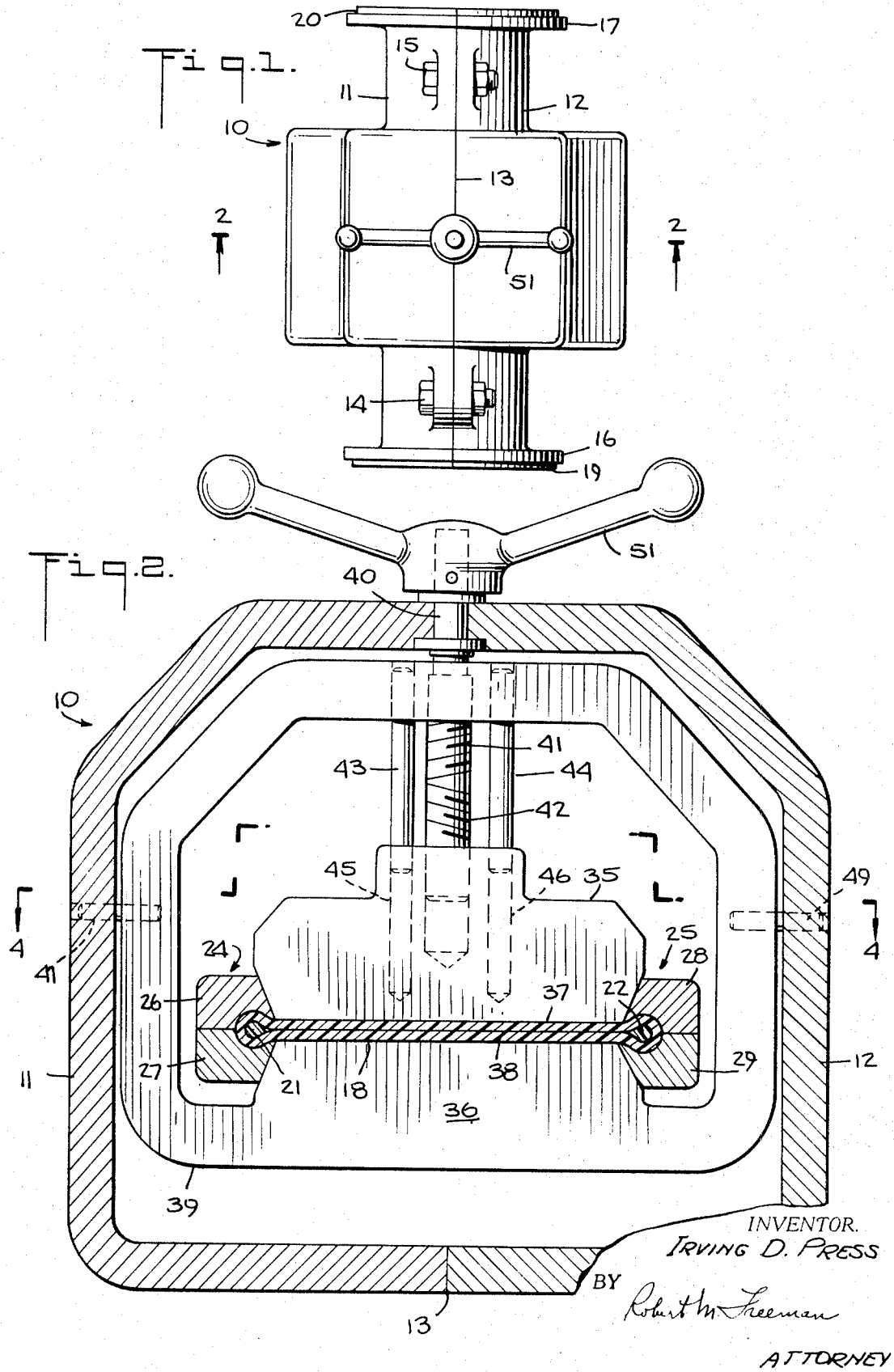

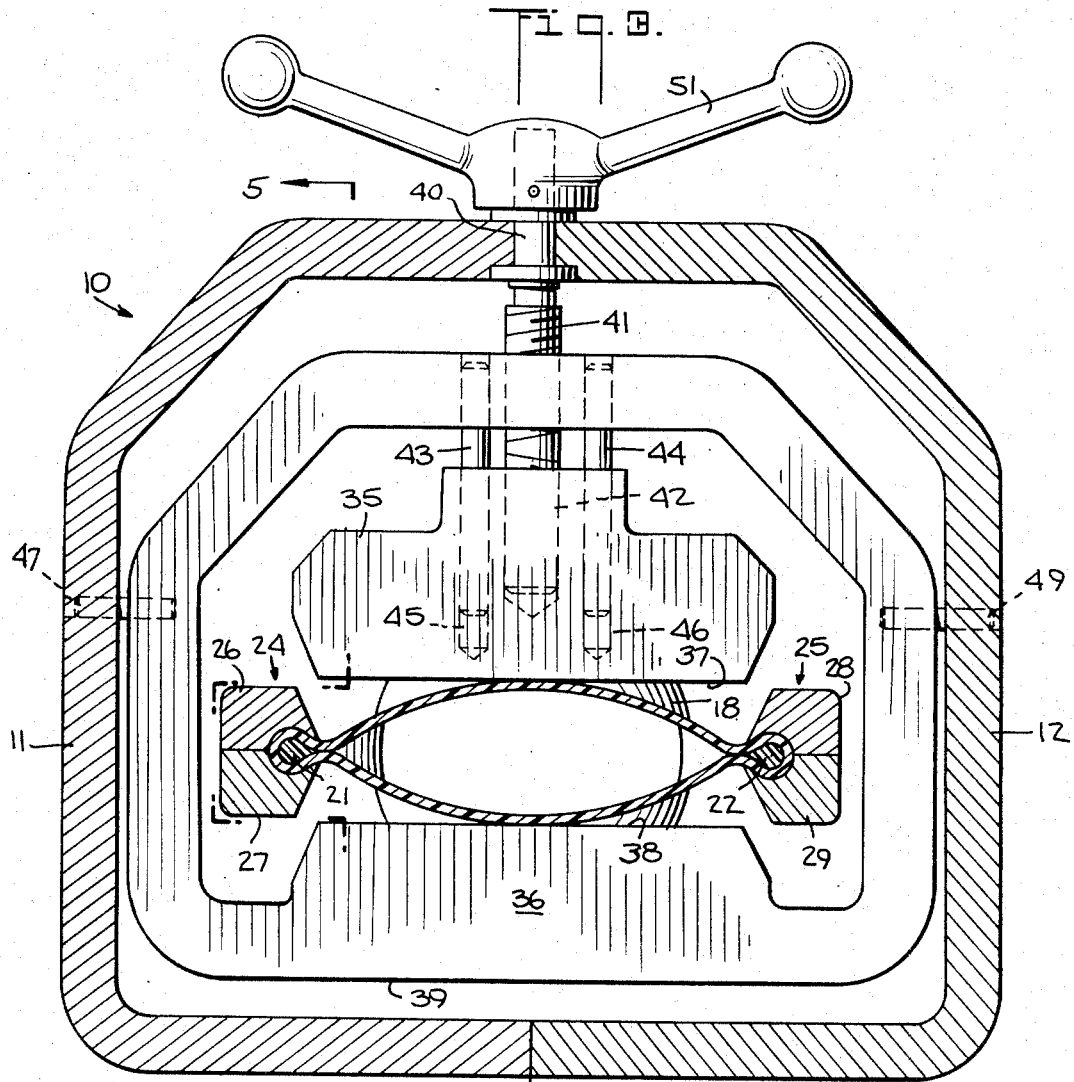

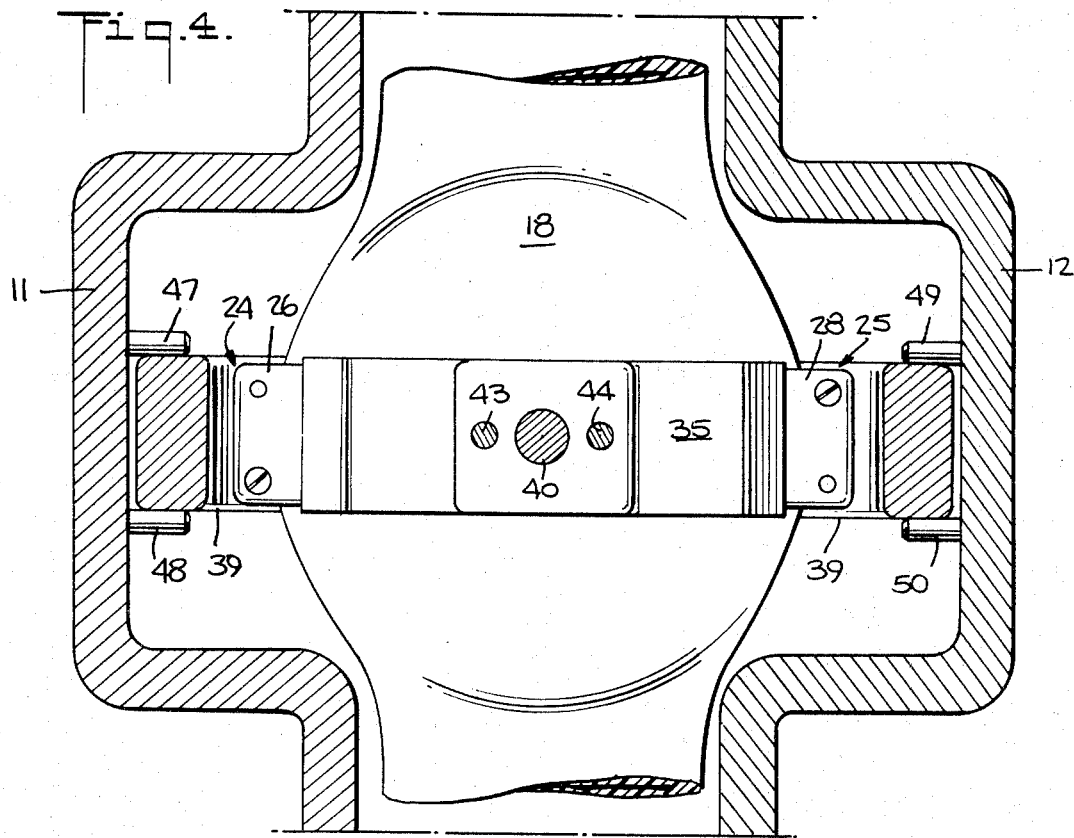
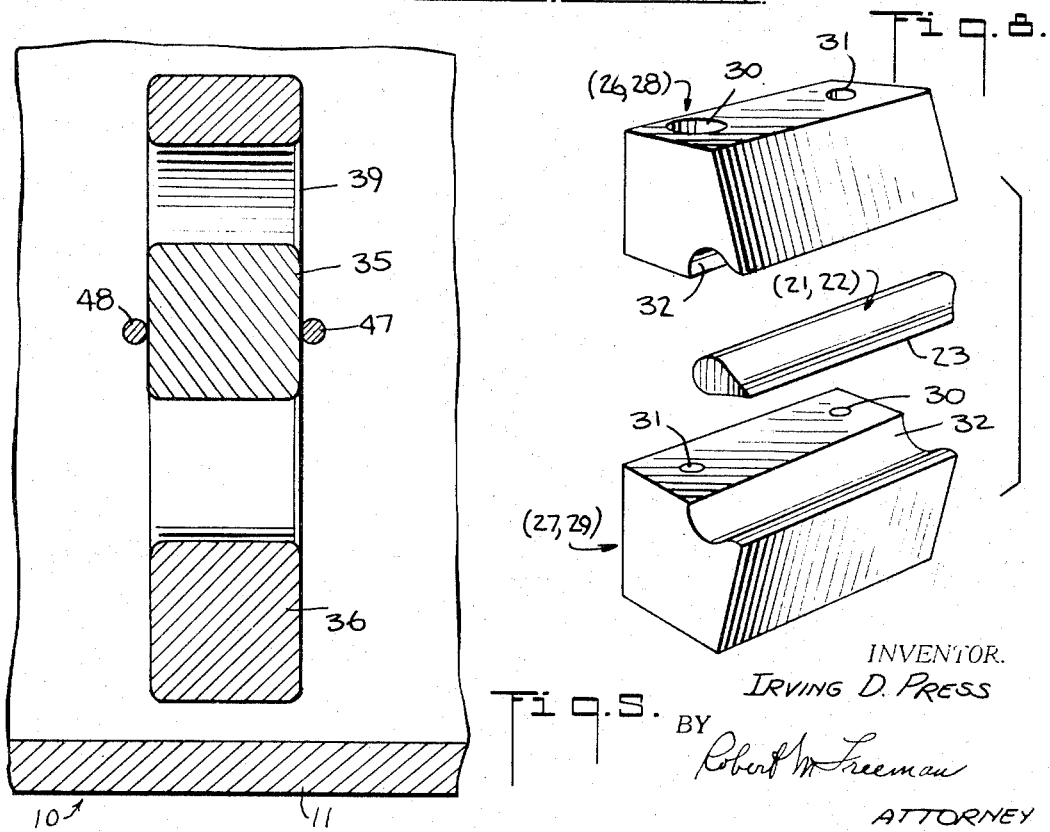

CONSTRICTABLE TUBE VALVE

The present invention relates to fluid valves and, more particularly, to a valve of the type in which a constrictable tube is mechanically flattened to form a barrier to the flow of fluid material therethrough.

Valves relying upon the construction of a flexible tube have generally been referred to in the past as "pinch" valves. In their most rudimentary form they incorporate a clamp for literally pinching the flexible tube with which they are associated in order to occlude the passage of fluid therethrough. The well known hose clamp employed in every chemical laboratory is a valve of this type.

In its more refined form, the constrictable tube valve is tailored to a special purpose and may be quite complicated. While valves of the type wherein an orifice is blocked or controlled by a valve element are more common and more generally used, there are special circumstances under which a constrictable tube valve is preferable. For example, the constrictable tube valve is desirable where it is required to control the flow of fluids containing solid particles in substantial quantity or where corrosive fluids are involved. Particularly, in the case of corrosive fluids, the constrictable tube valve provides a convenient arrangement for isolating the fluid flow path from the operating mechanism of the valve and from other parts that might be attacked by the corrosive fluid.

Currently, one of the best, if not the best, corrosion resistant non-metallic materials is polytetrafluoroethylene resin, hereinafter referred to as PTFE. This resin is substantially inelastic and, in the thicknesses normally encountered in tube construction, is relatively crack sensitive. That is, in the usual thicknesses, a thin walled section of PTFE resin will crack when folded upon itself. Even if a crack does not develop the first time a fold is introduced in a section of the resin, cracks will develop if the folding operation is repeated more than a few times. Because of this characteristic, it has, heretofore, not been possible to produce a satisfactory constrictable tube type valve where the tube has been made of PTFE resin.

The cracking problem is not new to valves of this general type. Almost one hundred years ago there was described in U.S. Pat. No. 143,907 a valve of the constrictable type wherein the tube was made of india-rubber. The central part of the tube was made elliptical and with sharp internally projecting tongues in the corners for the purpose of allowing the two flat sides of the elliptical part of the tube to be pressed close together and to form a perfectly tight joint in the corners without danger of breaking the tube in those places. More recently, in U.S. Pat. No. 1,683,322 there is described a valve of this general type wherein the control tube is preferably molded to oblong cross-sectional form at its middle portion and, in order that the upper and lower walls may be brought into contact with each other closely adjacent the hinge line without excessive local flexure and strain, the walls are formed adjacent the hinge line with relatively thick, inwardly bulged zones so that the lining, when uncollapsed, has a passage which in cross-section is oblong, with reverse curves in its outline adjacent its extremities.

Unfortunately, in analyzing these prior attempts to solve the crack problem in connection with rubber or rubber-like tubing, it was discovered that they all were characterized by some point or points where excessive stress is developed during the closure of the valve. In addition, the techniques require special molding of the tubing, a circumstance not readily adaptable to PTFE resin. Thus, prior known techniques have not permitted a satisfactory valve to be constructed employing PTFE resin as the constrictable tube.

With the foregoing problems in mind, it is a primary object of the present invention to provide a constrictable tube type valve employing a tube of PTFE resin or similar substantially inelastic flexible generally crack-sensitive plastic. A concomitant object is to provide such a valve capable of operating with relatively high fluid pressures and having a useful life of many thousands of operating cycles. An ancillary object is to extend the operating life of constrictable tube valves made with any flexible material even an elastomer.

The present invention is predicated upon the discovery that the difficulty in producing a constrictable tube valve with a PTFE resin tube using heretofore known techniques resides in the very pinching from which the pinch valve derives its name. Hence, it is a further object of the present invention to provide a constrictable tube valve wherein literal pinching of the tube is completely avoided. Reliance is had upon constriction or compression of the tube wall without pinching.

In accordance with one aspect of the present invention, there is provided a valve of the type in which a constrictable tube is mechanically flattened to form a barrier to the flow of fluid material therethrough which incorporates the improvement comprising, in addition to the constrictable tube, means disposed at opposite sides of the tube for maintaining a region at each side in constantly constricted fluid sealing condition. In addition, mechanical compressor means are provided for adjustably constricting the remainder of the tube between said regions for controlling the closing of the valve. More particularly, the means disposed at the opposite sides of the tube comprise at each side a fluid impervious filler piece disposed on the interior of the tube and means securing the corresponding side of the tube in fluid sealing embrace about the filler piece.

The invention will be better understood after reading the following detailed description of a presently preferred embodiment thereof with reference to the appended drawings wherein:

FIG. 1 is a plan view of a valve embodying the invention;

FIG. 2 is a transverse sectional view taken along line 2—2 in FIG. 1 showing the valve in closed condition;

FIG. 3 is a view similar to FIG. 2 showing the valve in open condition;

FIG. 4 is a fragmentary longitudinal sectional view taken along line 4—4 in FIG. 2;

FIG. 5 is a fragmentary sectional view taken along line 5—5 in FIG. 3;

FIG. 6 is an enlarged fragmentary sectional view showing one side of the tube with a filler piece in place and clamping means thereabout when the valve is in open condition;

FIG. 7 is a view similar to FIG. 6 when the valve is in closed condition; and

FIG. 8 is an exploded perspective view of a preferred filler piece and a clamp as used in the valve illustrated in the other figures.

The same reference numerals are used throughout the drawings to designate the same or similar parts.

Referring now to the drawings, a valve housing is shown generally at 10 consisting of two halves 11 and 12 joined along the longitudinal line 13 (best seen in FIG. 1) by the bolts 14 and 15 and similar bolts (not seen) on the underside of the valve as viewed in FIG. 1. Disposed between the end flanges 16 and 17 of the housing 10 is a constrictable tube 18. While the tube 18 need not be monolithic and may be made of other materials, it is in this example formed from a single layer of PTFE. A suitable PTFE tube may be produced employing the method set forth in U.S. Pat. No. 2,752,637 issued July 3, 1956, and assigned to the same assignee as the present application. The ends of the tube 18 may be flared at 19 and 20 over the faces of the corresponding flanges 16 and 17, respectively. While the present invention can be used advantageously with most any wall thickness, it is contemplated that the tube 18 when formed from PTFE resin will have a wall thickness preferably at least 0.040 inches.

Disposed at opposite sides of the tube 18, on the interior thereof, are filler pieces 21 and 22. These pieces must be fluid impervious elements. The filler piece should have a smoothly curving contour to which the tube may be conformed by wrapping therearound without inducing a crack in the tube wall. As best seen in FIGS. 6 and 7, the filler piece preferably is in the form of a cylinder with a directrix of substantially tear-drop shape such that the piece has substantially a featheredge at 23. As shown in FIG. 8, the filler piece is generally trapezoidal in outline. The filler piece is installed in the tube such that when the tube is wrapped around the filler piece the featheredge 23 faces radially inwardly of the tube. The filler piece is preferably produced from sintered PTFE resin fabricated by any known method.

To permanently constrain the side edge of the tube around the filler piece, there is provided the clamping devices 24 and 25. These clamping devices 24 and 25 may be made up of individual members 26, 27 and 28, 29, respectively, which when secured together form two substantially C-shape assemblies with the side of the tube being confined by the jaws of the C-shape assembly in sealing engagement with the filler piece. As best seen in FIG. 8, the clamp members 26, 27, 28 and 29 may all be identical being provided with a through bore 30, optionally counterbored, and a tapped bore 31 on opposite sides thereof. Thus, when two of the members are clamped together, face-to-face, the bore 30 in one member will receive a bolt which will thread into the threaded bore 31 in the mating member and vice versa. As best seen in FIGS. 6 and 7, the clamp members 26 through 29 should have a jaw configuration following the smooth curve such as 32 in FIG. 6 in order to tightly embrace the tube 18 around the filler piece 22. In the preferred construction shown in FIG. 6, the jaw line 32 will be tear-drop shaped similar to the configuration of the filler piece.

As seen in FIG. 6, the clamp members 26 and 27 maintain the tube in constantly sealed condition from the bight point at 33 to the point 34 where the inner surfaces of the tube 18 part. For adjustably constricting the remainder of the tube between the end regions there is provided an upper compressor member 35 and a lower compressor member 36 having straight surfaces 37 and 38, respectively, for compressing the tube therebetween. As best seen in FIGS. 2 and 3, the compressors 35 and 36 are generally trapezoidal in shape where they come between the end clamps 24 and 25 in order to sealingly compress the tube as shown in FIG. 7.

The compressor 36 may be formed integral with a heavy yoke member 39. The yoke 39 is supported on a threaded shaft 40 along an upper portion provided with the right-hand threads at 41. The shaft 40 is provided at its lower end with a left-hand threaded section 42 which threadedly engages the compressor member 35. Guide pins 43 and 44 are secured in the upper end of the yoke 39 and slide in bores 45 and 46, respectively, in the compressor member 35 for guiding and preventing rotation of the latter. Pins 47, 48, 49 and 50 installed in the side walls of the valve housing 10 straddle the side arms of the yoke 39 for guiding it in its movement without permitting rotation thereof.

The stem 40 is journaled in an aperture in the housing 10 and provided with a suitable handle 51. It should be appreciated from comparing FIGS. 2 and 3 that as the handle 51 is rotated in a clockwise or right-hand direction when viewed from the top, it causes the yoke 39 to move upward toward the handle while causing the compressor 35 to move downward away from the handle. With this action the valve is closed. When the handle 51 is rotated in the opposite direction, the reverse operation takes place with the valve opening. It will be understood that normally the fluid pressure within the valve will cause the tube to expand when the compressors are apart as shown in FIG. 3.

From a comparison of FIGS. 6 and 7, it should be readily apparent that the tube wall 18 experiences maximum flexing in the vicinity of the region 52. It should also be apparent that the tube leaves the clamps in a gradually curving configuration resulting in minimal stress during the flexure thereof. Thus, no part of the tube wall is subjected to severe stress during the operating life of the valve. Hence, the crack sensitivity of the material is no longer a significant problem.

As best seen in FIGS. 6 and 7, the featheredge 23 of the filler piece is located slightly inboard of the outer edge 53 of the clamp. The relative positioning of the featheredge 23 with respect to the outer edge of the clamp is not critical, however. It may be located either inboard, coincident, or outboard, depending upon the clamping force available from the cooperating compressor members.

While the term featheredge is employed in describing the edge 23 of the filler piece, it is not intended to imply that the edge must necessarily be paper thin. The thinner the edge the easier it is to establish a seal in the immediate vicinity where the inner surfaces of the tube wall are brought together. In practice the edge 23 may have significant thickness so long as the material of the tube or filler piece can be deformed or displaced sufficiently during closure of the valve to insure sealing. With a PTFE resin tube it is presently preferred that edge 23 have minimal thickness.

It should be apparent from the foregoing description that the invention because of the flexing geometry will serve to extend the life of a constrictable tube valve made with any flexible material, even an elastomer. The arrangement can be used with especial advantage with all crack-sensitive flexible materials, not only PTFE resin. It is also contemplated that the tube of flexible material may be reinforced with one or more layers of reinforcing material.

Having described a presently preferred embodiment of the invention, it will be understood that various changes may be made in the construction thereof without departing from the true spirit of the invention as defined in the appended claims.

What is claimed is:

1. In a valve of the type in which a constrictable tube is mechanically flattened to form a barrier to the flow of fluid material therethrough, the improvement comprising a constrictable tube, external clamping means disposed at opposite sides of said tube for maintaining a region at each side in constantly constricted fluid sealing condition, and mechanical compressor means for adjustably constricting the remainder of said tube between said clamping means for controlling the closing of said valve such that the entire remainder of said tube at least along a line between said clamping means is substantially engaged by said compressor means in a closed position.

2. A valve according to claim 1, wherein said means disposed at opposite sides of said tube comprises at each side a fluid impervious element located on the interior of said tube with said clamping means securing the corresponding side of said tube in fluid sealing embrace about said element.

3. A valve according to claim 1, wherein said means disposed at opposite sides of said tube comprises at each side a separate fluid impervious filler piece disposed on the interior of said tube with said clamping means securing the corresponding side of said tube in fluid sealing embrace about said filler piece.

4. A valve according to claim 3, wherein said tube is wrapped around said filler piece so as to close upon itself and is so constrained by said clamping means, said filler piece having a smoothly curving contour to which said tube conforms.

5. A valve according to claim 3, wherein said filler piece is in the form of a cylinder with a directrix of substantially tear-drop shape such that the piece has substantially a featheredge, said tube being wrapped around said filler piece and maintained in sealing engagement therewith with said featheredge facing radially inwardly of the tube.

6. A valve according to claim 5, wherein said tube includes at least a lining layer of a substantially inelastic flexible generally crack sensitive plastic.

7. A valve according to claim 6, wherein said plastic is polytetrafluoroethylene resin.

8. A valve according to claim 7, wherein said filler piece is formed from polytetrafluoroethylene resin.

9. A valve according to claim 8, wherein each of said clamping means comprises two members which when secured together form a substantially C-shape assembly having a jaw configuration which is similar to the shape of said filler piece.

10. A valve according to claim 3, wherein said tube includes at least a lining layer of a substantially inelastic flexible generally crack sensitive plastic.

11. A valve according to claim 10, wherein said plastic is polytetrafluoroethylene resin.

12. A valve according to claim 11, wherein said filler piece is formed from polytetrafluoroethylene resin.

13. A valve according to claim 3, wherein each of said clamping means comprises two members which when secured together form a substantially C-shape assembly, the side of said tube being confined by the jaws of the C-shape assembly in sealing engagement with said filler piece.

14. A valve according to claim 3, wherein said tube includes at least a lining layer of a substantially inelastic flexible generally crack sensitive plastic, said tube being wrapped around said filler piece so as to close upon itself and being so constrained by said clamping means, and said filler piece is characterized by a smoothly curving contour to which said tube conforms.

15. A valve according to claim 14, wherein said plastic is polytetrafluoroethylene resin.

16. A valve according to claim 15, wherein said filler piece is formed from polytetrafluoroethylene resin.

17. In a valve of the type in which a constrictable tube is flattened to form a barrier to the flow of fluid material therethrough, the improvement comprising a constrictable tube, means disposed at opposite sides of said tube for maintaining a region at each side in constantly constricted fluid sealing condition, said means including at each side of said tube a separate fluid impervious filler piece disposed on the interior of said tube and a clamping device disposed on the exterior of said tube, said clamping device being constructed and arranged to constrict the side of said tube about said filler piece in fluid sealing embrace, and means for adjustably constricting the remainder of said tube between said regions for controlling the closing of said valve.

* * * * *